(12) United States Patent
Farhangi et al.

(10) Patent No.: US 10,733,737 B2
(45) Date of Patent: Aug. 4, 2020

(54) SYSTEM AND METHOD OF AUTOMATED SEGMENTATION OF ANATOMICAL OBJECTS THROUGH LEARNED EXAMPLES

(71) Applicant: University of Louisville Research Foundation, Inc., Louisville, KY (US)

(72) Inventors: Mohammad Mehdi Farhangi, Louisville, KY (US); Amir A. Amini, Louisville, KY (US); Hichem Frigui, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 0 days.

(21) Appl. No.: 16/050,150

(22) Filed: Jul. 31, 2018

(65) Prior Publication Data
US 2019/0122365 A1 Apr. 25, 2019

Related U.S. Application Data

(60) Provisional application No. 62/539,310, filed on Jul. 31, 2017.

(51) Int. Cl.
*G06T 7/11* (2017.01)
*G06T 7/149* (2017.01)
(Continued)

(52) U.S. Cl.
CPC ............. *G06T 7/11* (2017.01); *G06T 7/12* (2017.01); *G06T 7/149* (2017.01); *G06T 7/181* (2017.01);
(Continued)

(58) Field of Classification Search
CPC . G06T 7/0012; G06T 7/11; G06T 7/12; G06T 7/13; G06T 7/33; G06T 7/35;
(Continued)

(56) References Cited

U.S. PATENT DOCUMENTS

| | | | |
|---|---|---|---|
| 2008/0317308 A1* | 12/2008 | Wu | G06K 9/4638 382/128 |
| 2011/0044521 A1* | 2/2011 | Tewfik | G06K 9/6206 382/131 |

(Continued)

OTHER PUBLICATIONS

Armato et al. (2011) The lung image database consortium (LIDC) and image database resource initiative (IDRI): a completed reference database of lung nodules on CT scans. Medical Physics 38:915-931.

(Continued)

*Primary Examiner* — Diane D Mizrahi
(74) *Attorney, Agent, or Firm* — Jenkins, Wilson, Taylor & Hunt, P.A.

(57) ABSTRACT

A method and system of automated segmentation of an anatomical object through learned examples include: receiving, by a processing device, an image of the anatomical object; determining a sparse representation of a shape of the anatomical object by iteratively evolving a segmenting surface as a combination of a level set segmentation and a linear combination of training shapes; and outputting, to an output device, the sparse representation of the shape of the anatomical object as the segmentation of the anatomical object.

4 Claims, 11 Drawing Sheets
(6 of 11 Drawing Sheet(s) Filed in Color)

(51) Int. Cl.
  *G06T 7/30* (2017.01)
  *G06T 7/181* (2017.01)
  *G06T 7/12* (2017.01)
(52) U.S. Cl.
  CPC ...... *G06T 7/30* (2017.01); *G06T 2207/20081* (2013.01); *G06T 2207/20116* (2013.01); *G06T 2207/20161* (2013.01); *G06T 2207/30064* (2013.01)
(58) Field of Classification Search
  CPC . G06T 2207/10076; G06T 2207/10081; G06T 2207/10101; G06T 7/162; G06T 2207/10132
  See application file for complete search history.

(56) References Cited

U.S. PATENT DOCUMENTS

| | | | | |
|---|---|---|---|---|
| 2015/0201907 | A1* | 7/2015 | Stergiopoulos | A61B 8/5223 600/371 |
| 2019/0122073 | A1* | 4/2019 | Ozdemir | G06N 20/00 |

OTHER PUBLICATIONS

Badura & Pietka (2014) Soft computing approach to 3D lung nodule segmentation in CT. Computers in Biology and Medicine 53:230-243.
Caselles et al. (1997) Geodesic active contours. International Journal of Computer Vision 22:61-79.
Cavalcanti et al. (2016) Lung nodule segmentation in chest computed tomography using a novel background estimation method. Quantitative Imaging in Medicine and Surgery 6:16-24.
Chan & Vese (2001) Active contours without edges. IEEE Transactions on Image Processing 10:266-277.
Chen et al. (2014) Vessel attachment nodule segmentation using integrated contour model based on fuzzy speed function and shape-intensity joint bhattacharya distance. Signal Processing 103:273-284.
Clark et al. (2013) The cancer imaging archive (tcia): maintaining and operating a public information repository. Journal of Digital I 26:1045-1057.
Cremers et al. (2006) Kernel density estimation and intrinsic alignment for shape priors in level set segmentation. International Journal of Computer Vision 69:335-351.
Dehmeshki et al. (2008) Segmentation of pulmonary nodules in thoracic CT scans: a region growing approach. IEEE Trans Med Imaging 27:467-480.
Diciotti et al. (2011) Automated segmentation refinement of small lung nodules in CT scan by local shape analysis. IEEE Transactions on Biomedical Engineering 58:3418-3428.
Donoho (2006) For most underdetermined systems of linear equations the minimal 1-norm solution is also the sparsest solution. Communications on Pure and Applied Mathematics 59:797-829.
Farag et al. (2013) A novel approach for lung nodules segmentation in chest CT using level sets. IEEE Transactions on Image Processing 22:5202-5213.
Farhangi et al. (2016) Incorporating shape prior into active contours with a sparse linear combination of training shapes: Application to corpus callosum segmentation. Conf Proc IEEE Eng Med Biol Soc 2016:6449-6452.
Fu (1998) Penalized regressions: the bridge versus the lasso. Journal of Computational and Graphical Statistics 7:397-416.
Kostis et al. (2003) Three-dimensional segmentation and growth-rate estimation of small pulmonary nodules in helical CT images. IEEE Trans Med Imaging 22(10):1259-1274.
Kuhnigk et al. (2006) Morphological segmentation and partial volume analysis for volumetry of solid pulmonary lesions in thoracic CT scans. IEEE Transactions on Medical Imaging 25:417-434.
Lassen et al. (2015) Robust semi-automatic segmentation of pulmonary subsolid nodules in chest computed tomography scans. Physics in Medicine and Biology 60:1307-1323.
Leventon et al. (2000) Statistical shape influence in geodesic active contours. 5th IEEE EMBS International Summer School on Biomedical Imaging 1:316-323.
Moltz et al. (2008) Segmentation of juxtapleural lung nodules in CT scans based on ellipsoid approximation. Proceedings of First International Workshop on Pulmonary Image Process. New York, 2008:25-32.
Mukhopadhyay (2016) A segmentation framework of pulmonary nodules in lung CT images. Journal of Digital Imaging 29:86-103.
Murphy et al. (2009) A large-scale evaluation of automatic pulmonary nodule detection in chest CT using local image features and k-nearest-neighbour classification. Medical Image Analysis 13:757-770.
Osher & Sethian (1988) Fronts propagating with curvature-dependent speed: algorithms based on hamilton-jacobi formulations. Journal of Computational Physics 79:12-49.
Reeves et al. (2006) On measuring the change in size of pulmonary nodules. IEEE Trans Med Imaging 25:435-450.
Van Ginneken (2006) Supervised probabilistic segmentatoin of pulmonary nodules in CT scans. Med Image Comput Comput Assist Interv 9(Pt 2):912-919.
Warfield et al. (2004) Simultaneous truth and performance level estimation (STAPLE): an algorithm for the validation of image segmentation. IEEE Transactions on Medical Imaging 23:903-921.
Way et al. (2006) Computer-aided diagnosis of pulmonary nodules on CT scans: segmentation and classification using 3D active contours. Medical Physics 33:2323-2337.
Won Cha (2016) 4D lung tumor segmentation via shape prior and motion cues. Conf Proc IEEE Eng Med Biol Soc 2016:1284-1287.
Wright et al. (2009) Robust face recognition via sparse representation. IEEE Transactions on Pattern Analysis and Machine Intelligence 31:210-227.
Ye et al. (2010) Automatic graph cut segmentatoin of lesions in CT using mean shift superpixels, Int J Biomed Imaging 2010:983963.
Zhang et al. (2012) Towards robust and effective shape modeling: Sparse shape composition. Medical Image Analysis 16:265-277.

\* cited by examiner

SYSTEM AND METHOD OF AUTOMATED SEGMENTATION OF ANATOMICAL OBJECTS THROUGH LEARNED EXAMPLES

RELATED APPLICATIONS

This application claims priority to U.S. Provisional Patent Application No. 62/539,310, filed Jul. 31, 2017, the entire disclosure of which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The presently-disclosed subject matter relates to a system and method of automated segmentation of anatomical objects through learned examples.

2. Description of Related Art

Lung cancer is one of the deadliest cancers worldwide for both men and women. It is estimated that 1.1 million people die of lung cancer every year. Early detection of lung cancer leads to more successful treatments, but unfortunately for the most part, lung cancer is not diagnosed until it has already spread throughout the body. Computer aided diagnosis (CAD) systems have come to assist radiologists to detect lung cancers in early stages by detecting, segmenting, and categorizing lung nodules. Segmentation is in fact a prerequisite and fundamental step in every CAD system.

Several attempts have been made to automatically segment nodule boundaries from X-ray computed tomography (CT) scans. But, segmentation is challenging. The challenges mostly come from low contrast and noise. Further confounding the task is that nodules can have a variety of shapes and may be attached to the pleural surface with the same Hounsfield Unit (HU). They may also have significant connections to neighboring vessels. From this point of view, Kostis et al. [2] divided lung nodules into four different categories named well-circumscribed, juxta-vascular, juxta-pleural, and pleural tail nodules. The last three cases pose difficulties for intensity based segmentation algorithms because nodules have HU very similar to those in the vascular and pleural space. Examples of these four categories are shown in FIG. 1, wherein image slice (a) shows a well-circumscribed nodule, image slice (b) shows a juxta-vascular nodule, image slice (c) shows a juxta-pleural nodule, and image slice (d) shows a pleural tail nodule. In the literature, the challenges have been addressed utilizing shape prior information and refinement [3][9]. The purpose of shape refinement being to keep the segmented area similar to expected shapes of nodules that are available.

To deal with nodules having different shape and HU characteristics, previously proposed methods restrict the segmentation to specific nodule types since shape refinement can then be done more accurately [10]. For example, [2], [11] proposed to segment only small solid nodules with homogeneous and solid texture whereas authors in [12] proposed an algorithm to deal with juxta-vascular nodules. In [13], authors restricted the method to juxta-pleural nodules and in [14], a method was proposed to segment non-solid and part-solid nodules from the rest of the CT scan.

In addition, some studies proposed preprocessing and post processing techniques to exclude vessels and the pleural surface from the final segmentation result; in [15], the authors proposed to perform a rough segmentation of juxtapleural nodules, including the pleural surface in the segmented result. Considering the fact that lungs are mostly convex except for the diaphragm and the cardiac region, the only cavity in the rough segmentation is separated using convex hull operation as the nodule boundary. Threshold-based region growing approach was followed by two post processing steps in [14] to detach pleural surface and vessels from non-solid and part-solid nodules. In [16] a multilevel approach consisting of Otsu thresholding, region growing, fuzzy connectivity analysis, morphological operations, and thickening was proposed to segment various types of pulmonary nodules. In [17] another multilevel approach was proposed where segmentation applied to each nodule slices individually. The authors modeled nodules changes in consecutive slices by motion estimation assuming the differences between nodule in slices are small. They subtracted lesion slice from background slice followed by Otsu thresholding and morphological operations to detach connected organs. Finally, to segment juxta-vascular nodules, [10] extracted the vessels from an initial segmentation by taking advantage of anatomical information where vessels occupy a narrow region of the volume. By defining a threshold on the percentage of segmented voxels in a fixed cubic size, vessels were separated from the nodule.

Reeves et al. [3] utilized adaptive thresholding, in which the threshold is computed separately for each scan to compensate for the variations between two consecutive scans. The midpoint of the nodule and parenchymas density was chosen as the threshold. They applied geometrical constraints to keep the segmented nodule in a spherical shape while removing vessels from the final segmentation. Dehmeshki et al. [7] proposed sphericity contrast based region growing, in which each pixel of the boundary was added to the segmented region according to their intensity contrast and distance to the center of the region. While the latter metric followed the spherical shape assumption, another shape constraint was applied to stop the segmentation if the size was greater than a predefined threshold. In [18], region growing was also used where the decision of neighbors to be included in the nodule area was carried out by machine learning methods. For each voxel, a feature vector was extracted and fed to a classifier to predict its label based on a linear or non-linear classifier trained over pre-segmented nodules.

Way et al. [6] proposed to segment 3D lung nodules by a snake based algorithm. They extended gradient, energy and curvature to 3D images, and defined a prior mask energy which penalized the curves that grow beyond the pleural surface. In another attempt to incorporate active contours in this application, Farag et al. [5] proposed a 2D variational approach to model density of nodules as nonparametric Gaussian distributions favoring elliptical shapes. Graph-cut based segmentation is another successful approach to segment nodules in the lung. Ye et al. [8] used density, shape and spatial features to define an energy function for segmentation. The graph cut algorithm was applied to the oversegmented image previously obtained from unsupervised clustering of image features forcing a spherical shape prior. Another attempt in this area was by Cha et al. [9] where a sequence of graph-cuts iterations were performed, each of which with different unary potentials computed from both intensity values and a shape prior. Shape prior in each iteration changes to adapt to the segmented volume in the current iteration.

BRIEF SUMMARY OF THE INVENTION

In accordance with one aspect of the invention, a method of automated segmentation of an anatomical object through learned examples includes: receiving, by a processing device, an image of the anatomical object; determining a sparse representation of a shape of the anatomical object by iteratively evolving a segmenting surface as a combination of a level set segmentation and a linear combination of training shapes; and outputting, to an output device, the sparse representation of the shape of the anatomical object as the segmentation of the anatomical object.

In one implementation, prior to performing segmentation, the method further includes roughly aligning the shape of the anatomical object by determining a center of a Signed Distance Function (SDF) of the shape and applying an intrinsic alignment method to align the shape with a center of a selected reference shape.

In another implementation, the method further includes vectorizing and storing SDFs ($\varphi_i$; i=1; ..., n) of all training shapes in columns of a matrix $D=[\varphi_1|\varphi_2| \ldots |\varphi_n|] \in \mathbb{R}^{m \times n}$ defined as a dictionary, with each column defined as an atom, m defined as a number of voxels in each training shape image, and n defined as a size (number) of training shapes, such that a shape SDF $\phi \in \mathbb{R}^m$ may be approximated as $$\phi \approx \tilde{\phi}(x) = Dx, \qquad (6)$$

where $x \in \mathbb{R}^n$ is a weight vector which determines the contribution of each training shape in modeling the shape $\phi$.

In yet another implementation, determining a sparse representation of the shape of the anatomical object includes: defining an objective function which minimizes an error between the shape of the anatomical object and the shape of the evolving surface; and initializing x randomly and $\phi$ as the shape SDF at substantially the center of the anatomical object in the image. While an energy of the evolving segmenting surface of a subsequent iteration changes more than a threshold amount over an energy of the evolving segmenting surface of a previous iteration, then the method further includes: determining a sparse approximation of the evolving surface; updating the evolving surface as the combination of the level set segmentation and the linear combination of training shapes, the combination weighted by a sparsity of the linear combination of training shapes; and refining the updated evolving surface by iteratively updating the objective function along one coordinate while keeping all other coordinates fixed. When the energy of the evolving segmenting surface of the subsequent iteration does not change more than the threshold amount over the energy of the evolving segmenting surface of the previous iteration, then the method includes outputting the evolving segmenting surface of the subsequent iteration as the sparse representation of the shape of the anatomical object and as the segmentation of the anatomical object.

In accordance with another aspect of the invention, a system of automated segmentation of an anatomical object through learned examples, includes: an imaging device configured to acquire an image of the anatomical object; a data storage device configured to store the image of the anatomical object; a processing device configured for receiving the image of the anatomical object, and determining a sparse representation of a shape of the anatomical object by iteratively evolving a segmenting surface as a combination of a level set segmentation and a linear combination of training shapes; and an output device configured for outputting the sparse representation of the shape of the anatomical object as the segmentation of the anatomical object.

In one implementation, the processing device is further configured for, prior to performing segmentation, roughly aligning the shape of the anatomical object by determining a center of a Signed Distance Function (SDF) of the shape and applying an intrinsic alignment method to align the shape with a center of a selected reference shape.

In another implementation, the processing device is further configured for vectorizing and storing SDFs ($\varphi_i$; i=1; ..., n) of all training shapes in columns of a matrix $D=[\varphi_1|\varphi_2| \ldots |\varphi_n|] \in \mathbb{R}^{m \times n}$ defined as a dictionary, with each column defined as an atom, m defined as a number of voxels in each training shape image, and n defined as a size (number) of training shapes, such that a shape SDF $\phi \in \mathbb{R}^m$ may be approximated as $$\phi \approx \tilde{\phi}(x) = Dx, \qquad (6)$$

where $x \in \mathbb{R}^n$ is a weight vector which determines the contribution of each training shape in modeling the shape $\phi$.

In yet another implementation, the processing device, in determining a sparse representation of the shape of the anatomical object, is configured for: defining an objective function which minimizes an error between the shape of the anatomical object and the shape of the evolving surface; and initializing x randomly and $\phi$ as the shape SDF at substantially the center of the anatomical object in the image. While an energy of the evolving segmenting surface of a subsequent iteration changes more than a threshold amount over an energy of the evolving segmenting surface of a previous iteration, then the processing device is further configured for: determining a sparse approximation of the evolving surface; updating the evolving surface as the combination of the level set segmentation and the linear combination of training shapes, the combination weighted by a sparsity of the linear combination of training shapes; and refining the updated evolving surface by iteratively updating the objective function along one coordinate while keeping all other coordinates fixed. When the energy of the evolving segmenting surface of the subsequent iteration does not change more than the threshold amount over the energy of the evolving segmenting surface of the previous iteration, then the processing device is configured for outputting to the output device the evolving segmenting surface of the subsequent iteration as the sparse representation of the shape of the anatomical object and as the segmentation of the anatomical object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAIL DESCRIPTION OF EXEMPLARY EMBODIMENTS

Figure 1:
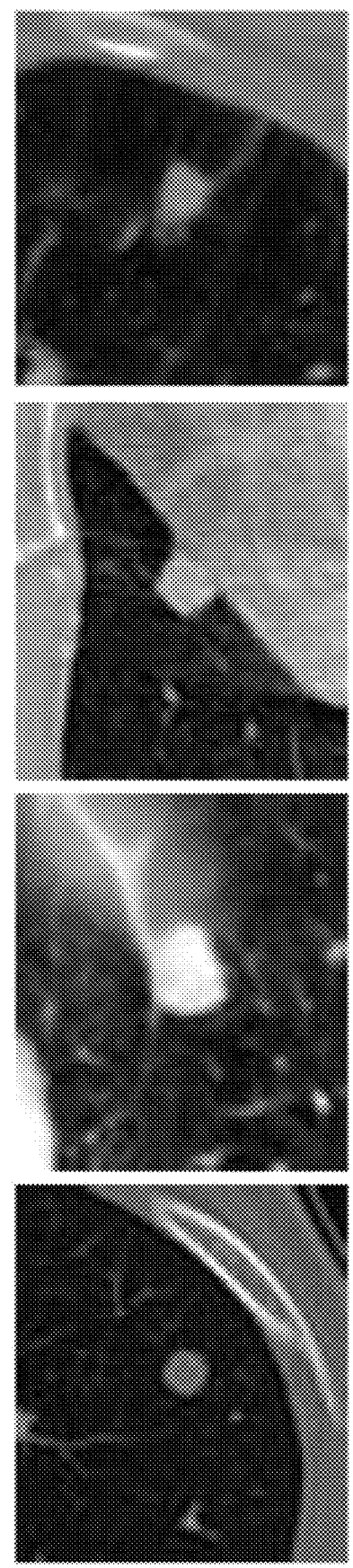
FIG. 1 is a collection of image slices (a)-(d) showing lung nodules classified based on attachment.

The details of one or more embodiments of the presently-disclosed invention are set forth in this document. Modifications to embodiments described herein, and other embodiments, will be evident to those of ordinary skill in the art after a study of the information provided herein. The information provided herein, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by one of ordinary skill in the art, definitions are set forth herein to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "imaging device" is used to describe a device for creating visual representations of the interior of a body for clinical analysis and medical intervention, as well as visual representation of the function of some organs or tissues. Exemplary imaging devices include: x-ray (projectional radiographs), fluoroscopes, magnetic resonance imaging (MRI) instruments or nuclear magnetic resonance (NMR) scanners, x-ray computed tomography (CT) or computed axial tomography (CAT) scanners, positron emission tomography (PET) scanners, and ultrasonography (ultrasound) scanners.

As used herein, the term "processing device" is used to describe one or more microprocessors, microcontrollers, central processing units, Digital Signal Processors (DSPs), Field-Programmable Gate Arrays (FPGAs), Application-Specific Integrated Circuits (ASICs), or the like for executing instructions stored on a data storage device.

As used herein, the term "data storage device" is understood to mean physical devices (computer readable media) used to store programs (sequences of instructions) or data (e.g. program state information) on a non-transient basis for use in a computer or other digital electronic device. The term "memory" is often (but not always) associated with addressable semiconductor memory, i.e. integrated circuits consisting of silicon-based transistors, used for example as primary memory but also other purposes in computers and other digital electronic devices. Semiconductor memory includes both volatile and non-volatile memory. Examples of non-volatile memory include flash memory (sometimes used as secondary, sometimes primary computer memory) and ROM/PROM/EPROM/EEPROM memory. Examples of volatile memory include dynamic RAM memory, DRAM, and static RAM memory, SRAM.

As used herein, the term "segmentation" refers to the process of partitioning a digital image into multiple segments (sets of pixels), with a goal of simplifying or changing the representation of the image into something that is easier to analyze. More precisely, image segmentation is the process of assigning a label to every pixel in an image such that pixels with the same labels share certain characteristics.

As used herein, the term "shape prior information" refers to prior knowledge about shapes likely to be in a given image, including metrics on spaces of shapes, statistical models of shape variation, and dynamic models which allow the imposition of a statistical model of the temporal evolution of a shape.

As used herein, the term "sparse representation" refers to sparse (a matrix in which most of the elements are zero) solutions for systems of linear equations.

Figure 2:
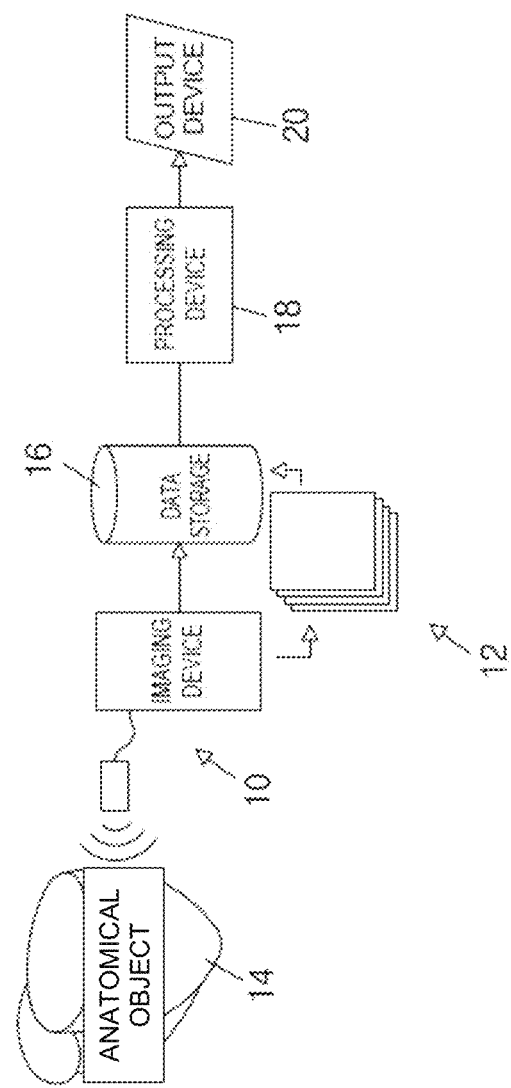
FIG. 2 is a functional block diagram of an exemplary system for automated segmentation of anatomical objects through learned examples according to the invention.

FIG. 2 is a functional block diagram of an exemplary system of automated segmentation of anatomical objects through learned examples according to the invention. As shown in FIG. 2, and imaging device 10 is configured to acquire an image 12 (i.e., a 3D dataset) of an anatomical object 14. The imaging device 10 is in communication with a data storage device 16, which is configured to store the image 12. A processing device 18 is in communication with the data storage device 16 and is configured to perform automated segmentation of the anatomical object through learned examples, as discussed in more detail below. A output device 20, such as a video display or a printer or the like, is in communication with the processing device 18 and is configured to display the segmentation of the anatomical object 14.

Figure 3:
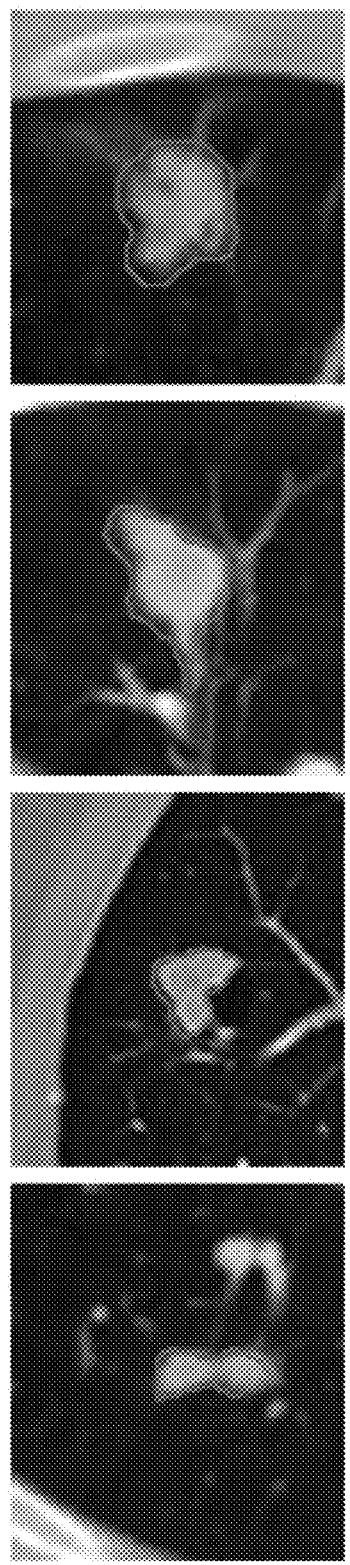
FIG. 3 is a collection of image slices (a)-(d) showing lung nodules as they might appear with different shapes in a lung.

As can be seen from the description of related art, above, many of the previously proposed methods assume that the nodule has spherical or ellipsoidal shape that might be attached to vessel or pleura with similar densities. However, as may be seen in FIG. 3, which shows nodules as they might appear with different shapes in a lung, this assumption is unrealistic in general as the nodules can have complicated structures. The ellipsoidal shape assumption is a limitation, resulting in the segmenting surface to become overly rounded, preventing capture of fine structures.

In the exemplary embodiments described herein, a new segmentation method is described which deals with the aforementioned challenges in a unified framework, permitting application of the same method to different nodule categories. The exemplary embodiments consider shape variability of nodules and bring this information to the segmentation process. In contrast to previously proposed approaches, the exemplary embodiments have an adaptive model of the shape which dynamically contributes to the segmentation during surface evolution. Nodule shapes in the exemplary embodiments are not restricted to a predefined structure; instead, the exemplary embodiments capture the best shape model by approximating the evolving surface by a linear combination of training shapes in a subspace, resulting in a sparse representation of nodule shapes. Sparse representation provide the means to neglect the nodules in the training set that do not contribute to a linear approximation of an input shape. It also affords an opportunity to recover local details even if these details are only present in a small fraction of training shapes. In addition, sparsity can be viewed as validation for segmentation. In other words, when the segmenting surface can be reconstructed by a sparse linear combination of training shapes, it is likely that the method has reached the true boundary of the nodule.

Sparse representation has already found success in other applications like face recognition [19], a snake based segmentation algorithm [20], as well as in segmentation of 2D mid-sagittal MR images of the corpus callosum [21]. Here a 2D methodology in [21] is extended to 3D and the resulting method is applied to lung nodule segmentation. For this purpose, the region based active contour algorithm was extended to 3D, permitting shape information to be incorporated by 3D Signed Distance Functions (SDF) delineating 3D shapes. Also, unlike the previous work in [21], the prior shape weight is adaptive and a function of sparsity of shape reconstruction.

Level Set Segmentation

Although any curve evolution algorithm could be used within the proposed framework, the exemplary embodiments described herein use an adaptation of the Chan-Vese algorithm [22], which is a region-based active contour. The advantages of this method over the edge based realization of active contours [23] in lung nodule segmentation application are described here:

First, the Chan-Vese segmentation is more robust to noise and blurry edges; a situation that appear in lung nodule CT images. Thus, it can handle non-solid nodules better; these nodules suffer from a lack of sharp boundaries.

Second, the Chan-Vese algorithm is less sensitive to contour position compared to edge based active contours. In more detail, edge based active contours in their classical form grow or shrink until they reach the edges, but the contour keeps growing or shrinking if they miss an edge.

On the other hand, contours that are driven by Chan-Vese energy functional can return back and modify themselves in case they pass through the nodule boundary. As will be seen, this property makes region based active contours more suitable for the present application since the contribution of shape prior, might slightly mislead the contour during the evolution.

The exemplary method is modeled to deform a segmenting surface by a force based on the Chan-Vese image intensity and shape prior information until the deformable surface stops in a location that separates two homogeneous regions and best approximates shape prior.

Let I be the volumetric image and $\Omega$ the domain of I. $C \in \Omega$ is a surface that separates image volume into two segmented regions, and $x \in \mathbb{R}^3$ denotes an arbitrary point in the volume I. To find the desired segmenting surface C, one step of the exemplary method is to minimize the following functional $$E_{cv}(C) = k_1 SurfaceArea(C) + k_2 \text{Volume}(\text{inside}(C)) + \qquad (1)$$

$$k_3 \int_{inside(C)} (I-\mu)^2 dx + k_4 \int_{outside(C)} (I-\nu)^2 dx.$$

In this equation, $k_1$-$k_4$ are weighting parameters and $\mu$ and $\nu$ represent the average intensity values inside and outside of the surface C respectively. The first two terms, defined on the area and volume of the surface, control the smoothness and the volume of the separating surface. The last two terms are external energies which help separate two homogeneous regions in the image.

To utilize the advantages of implicit representation, the surface C may be represented as the zero level set of Lipschitz function $\phi$ [24]. $\phi$ is a Signed Distance Function (SDF) which encodes the distance of every point in the image to the boundary. $\phi(x)$ is positive if the point $x \in \mathbb{R}^3$ lies outside the surface, and is negative if this point is inside the surface. Locations where $\phi$ crosses zero represent the bounding surface.

Figure 4A:
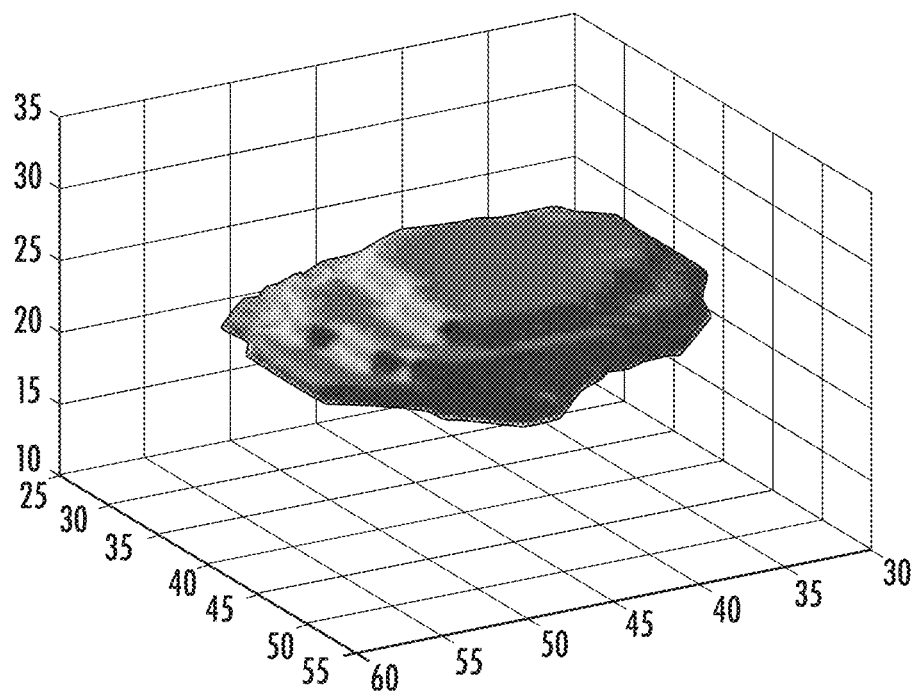
FIG. 4(*a*) is a representation of a nodule shape by a zero level set of a Signed Distance Function (SDF).
FIG. 4(b) is the SDF of a mid-slice of the nodule shape, superimposed with the nodule boundary shown in green on the surface and also projected onto the x-y plane.
Figure 4B:
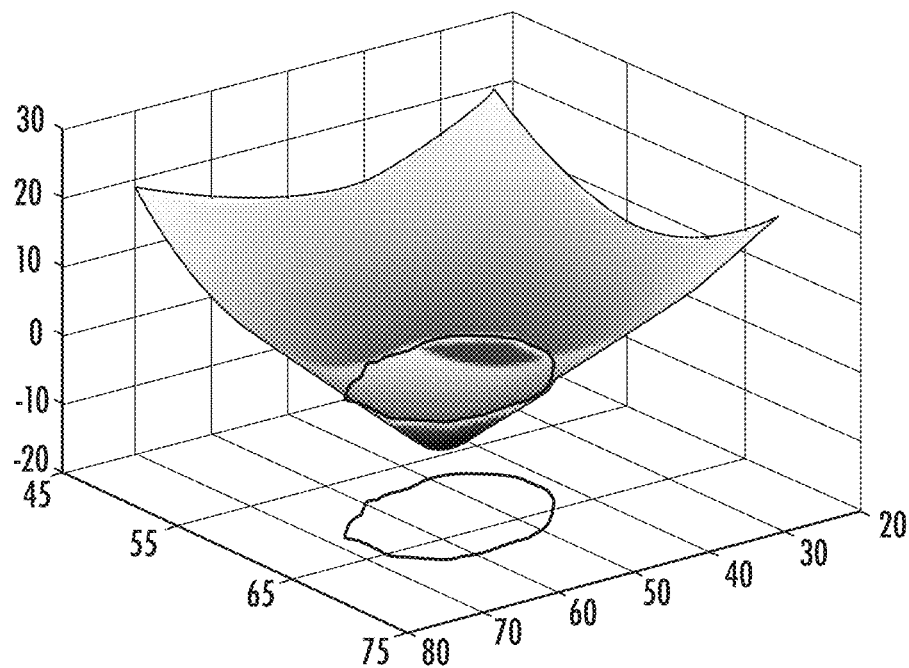

FIG. 4a and FIG. 4b show construction of the SDF for an arbitrary nodule shape. FIG. 4a shows the nodule (i.e., the zero level set of the SDF) and FIG. 4b displays the SDF of mid slice of this nodule (i.e., the SDF of a mid slice of the nodule shape, superimposed with nodule boundary shown in green on the surface and also projected onto the x-y plane). For any point, SDF encodes the closest distance to the boundary. For points inside the boundary SDF<0 and for points outside of the boundary SDF>0.

With the embedding the surface C inside the zero level set of the SDF $\phi$, equation (1) may be written as:

$$E_{cv}(\phi) = k_1 \int_\Omega |\nabla H(\phi(x))|dx + k_2 \int_\Omega H(\phi(x))dx + \\ k_3 \int_\Omega (I-\mu)^2 H(\phi(x))dx + k_4 \int_\Omega (I-v)^2(1-H(\phi(x)))dx, \quad (2)$$

where $\nabla$ is the gradient operator and H is the Heaviside function whose definition is as follow:

$$H(z) = \begin{cases} 1, & \text{if } z \geq 0 \\ 0, & \text{if } z < 0 \end{cases}.$$

To minimize $E_{cv}$, the Euler-Lagrange equation is derived and $\phi$ is iteratively updated:

$$\frac{\partial \phi}{\partial t} = \delta(\phi)\left[k_1 div\left(\frac{\nabla \phi}{|\nabla \phi|}\right) - k_2 - k_3(I-\mu)^2 + k_4(I-v)^2\right]. \quad (3)$$

In (3), the symbol div refers to the divergence operator and div $$\left(\frac{\nabla \phi}{|\nabla \phi|}\right)$$

computes the curvature of the isosurfaces embedded in $\phi$. Further details about these and the numerical implementations can be found in [22]. To simplify subsequent descriptions, (3) is rewritten as:

$$\phi(t+1) = \phi(t) + V_{cv}(t), \quad (4)$$

where $V_{cv}(t)$ is the product of the right hand side of equation (3) and the time step, and is the amount of update for each iteration.

Shape Prior Modeling

One challenge in shape based segmentation is the alignment problem; to measure shape variations it is essential to compare like parts of shapes. Leventon et al. [25] showed that SDFs are robust to slight misalignment helping avoid exact registration. Thus, in the exemplary method, prior to performing segmentation, shapes are roughly aligned by computing the center of SDFs; subsequently applying an intrinsic alignment method as proposed by Cremer et al. [26]. The center of any input shape is computed from:

$$\mu_\phi = \int_\Omega xh(\phi(x))dx, \; h(\phi(x)) = \frac{H(\phi(x))}{\int_\Omega H(\phi(x))dx}. \quad (5)$$

The new shape $\phi$ is then translated so that its center is aligned with the center of a selected reference shape $\phi_0$.

To start building the shape prior, all registered SDFs ($\varphi_i$; i=1; ..., n) are vectorized and stored in columns (bases) of a matrix $D=[\varphi_1|\varphi_2| \ldots |\varphi_n|] \in \mathbb{R}^{m \times n}$ referred to as the dictionary with each column called an atom. Here, m is the number of voxels in each training image and n is the size of the training shapes. New shapes are modeled by a linear subspace of dictionary D. In more details, having the dictionary D, any new SDF $\phi \in \mathbb{R}^m$ may be approximated as $$\phi \approx \tilde{\phi}(x) = Dx, \quad (6)$$

where $x \in \mathbb{R}^n$ is a weight vector which determines the contribution of each training shape in modeling the new shape $\phi$. Linear combinations of SDFs in (6) do not necessarily result in a valid SDF representation [25]. However, since the linear combination will have positive and negative values, it encodes a shape at its zero level set. Starting from the zero level set, the encoded shape is then re-initialized to generate an SDF. The vector x in (6) is chosen to minimize the error between the input shape $\phi$ and its approximation; i.e., $$\underset{x}{\text{argmin}} \frac{1}{2}\|\phi - Dx\|_2^2. \quad (7)$$

Including all the atoms in the linear approximation in (7) will result in departure from the valid shape space. Thus, the exemplary method represents the nodule boundary compactly by an appropriate combination of training shapes, neglecting shapes from irrelevant nodule types. To achieve this, a constraint is included to limit the number of atoms that contribute to the linear approximation. More formally, (7) is revised to be:

$$\underset{x}{\text{argmin}} \frac{1}{2}\|\phi - Dx\|_2^2 \quad (8)$$

subject to $\|x\|_0 \leq k$.

Here, $\|x\|_0$ denotes the $l_0$ norm, which counts the number of non-zero elements in vector x, and the parameter k controls the sparsity of x. This problem is NP-hard (non-deterministic polynomial-time hard) in nature and cannot be solved efficiently. However, recent papers have shown that if the solution is sparse enough, the $l_0$ constraint can be replaced by the $l_1$ norm [27]. Adding the constraint to the objective function with a penalty term $\lambda$, equation (8) is rewritten as $$\underset{x}{\text{argmin}} \frac{1}{2}\|\phi - Dx\|_2^2 + \lambda\|x\|_1; \lambda \geq 0. \quad (9)$$

Unlike (8), the optimization problem in (9) is convex and can be solved efficiently.

Shape Prior Weighting

Another interpretation for (8) is that $\phi$ is a noisy or irregular shape which needs to be reconstructed from the bases in a shape dictionary. A sparse coding based on the dictionary gives us a low dimensional representation of $\phi$, removing irregularities from it. However, if the irregularities are dense, or the input shape is far from the atoms in the dictionary, for a fixed non-zero value of $\lambda$ in (9), $\phi$ cannot be sparsely represented. In other words, the sparse weight vector x emerging from the dictionary is sufficient to construct the shape prior as well as to decide the level of contribution of shape prior in segmentation.

Figure 5:
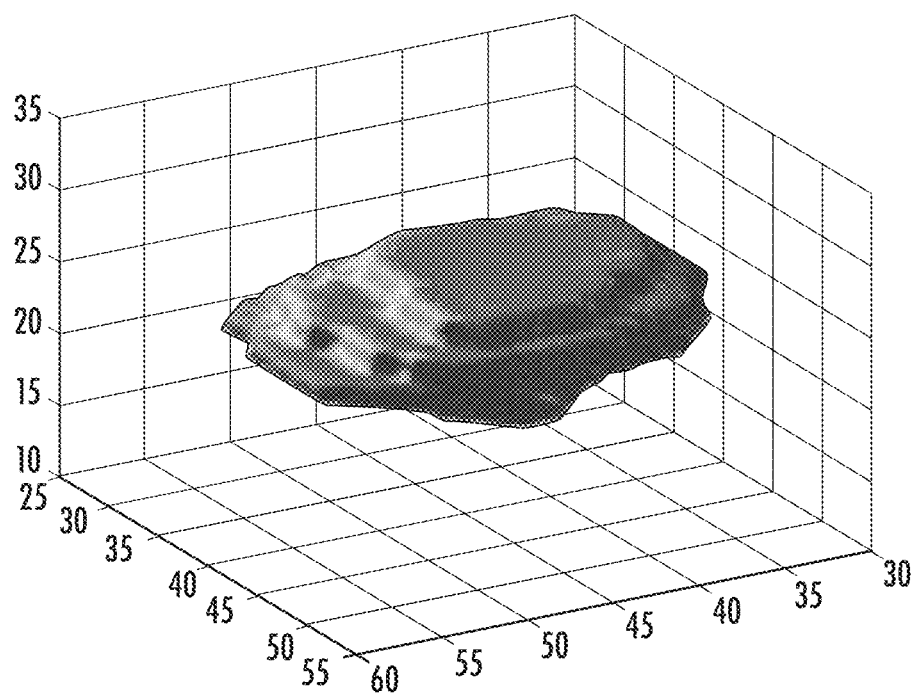
FIG. 5 is a schematic representation of a zero level set of an SDF corresponding to an actual nodule boundary.
Figure 6:
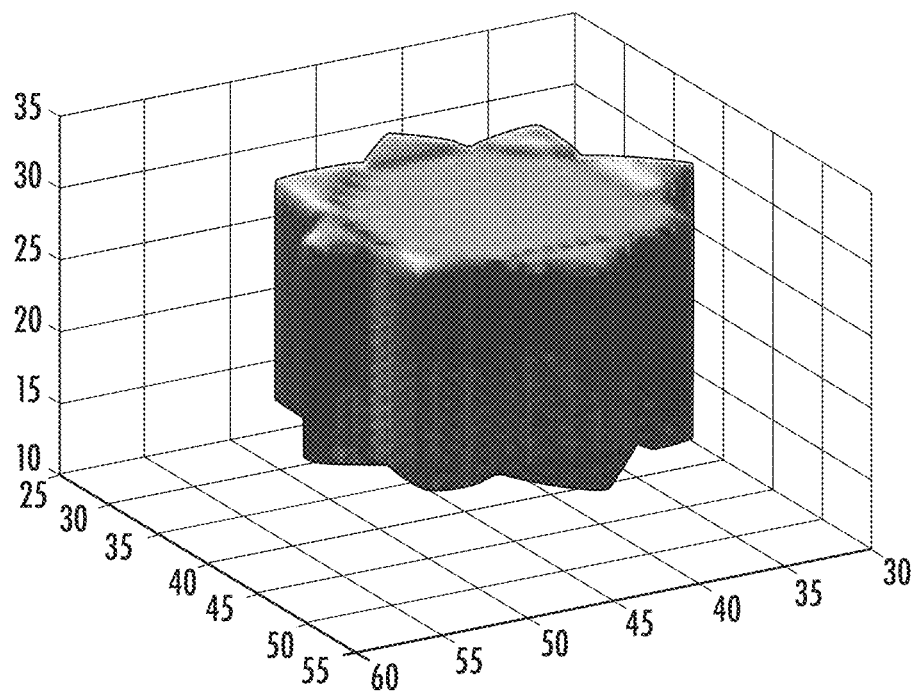
FIG. 6 is a schematic representation of a zero level set of an SDF with a structure significantly different from any actual nodule boundaries.

The following two cases better illustrate this. The first case has a boundary with an SDF that is already provided in the dictionary (FIG. 5). The second case is when the new shape is significantly different from all atoms in the dictionary (FIG. 6). For the first case, by solving (9), the reconstructed shape is highly sparse, resulting from just one non-zero value in vector x, an actual shape in the dictionary.

Figure 7:
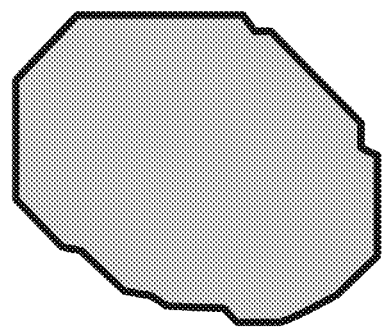
FIG. 7 is a mid plane of a SDF corresponding to the actual nodule boundary with the best Dx superimposed.
Figure 8:
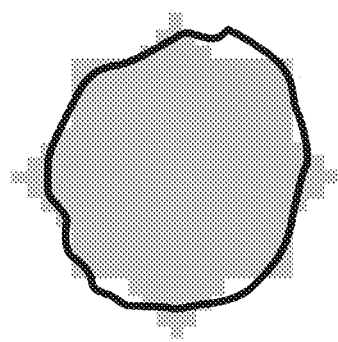
FIG. 8 is a mid plane of the arbitrary SDF together with the best Dx superimposed.

The middle slice of the reconstructed shape is shown in FIG. 7, with the contour accurately delineating the input shape. On the other hand, when the input shape is not similar to dictionary atoms as in FIG. 6, a significant number of shapes in the dictionary need to participate in the linear approximation in order to form a structure similar to the input shape. The reconstructed shape, shown in FIG. 8, is not sparse in this case—this reconstruction required more than 80% of the dictionary atoms in the linear approximation for the same value of λ in (9). Despite the large number of atoms used, the input shape cannot be accurately captured by the dictionary.

To take advantage of sparsity, the shape prior weighting is made related to the level of sparsity of vector x in (9); when the surface is evolving and is not close to a shape in the dictionary, it is primarily driven by the low level Chan-Vese energy function. Once the surface starts to form a nodule boundary, the sparsity increases and correspondingly, relative to Chan-Vese energy, the weighting for the shape prior is automatically increased. This prevents the evolving surface from leaking inside neighboring organs which have a similar range of HU.

Figure 9:
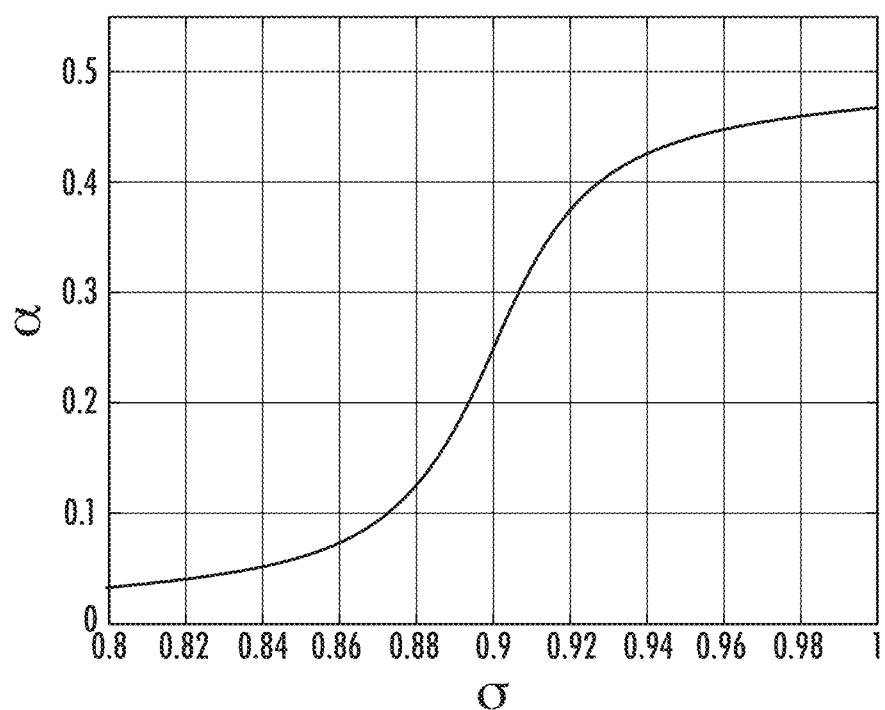
FIG. 9 is graph of shape prior weighting, α, plotted against σ (a metric defined so that the more sparse the representation, the closer its value to 1).

In order to map the sparsity to shape prior influence, a metric is defined so that the more sparse the representation the closer its value to 1: $\sigma(t) = e^{-s(t)}$, where $s(t)$ is the sparsity ratio; the number of non-zero elements in vector x divided by the length of the vector as a function of the iteration index, t. The shape prior weighting plotted in FIG. 9 is as follows, $$\alpha(\sigma) = \frac{\tan^{-1}(50(\sigma(t) - 0.9)) + \pi/2}{2\pi}. \quad (10)$$

The saddle point of $\tan^{-1}$ is set to $\sigma=0.9$ around which the shape prior weighting changes significantly.

Segmentation Method

Lastly, the exemplary method guides the segmenting surface to separate two homogeneous regions while forcing the segmentation to be consistent with the training shapes. For this purpose, another term is added to the surface evolution in (3). The new term alongside with original active contour equation helps guide the surface not only by low level intensity statistics, but also by high level shape prior information. In more details, in each step of surface evolution, it moves in a direction to optimize the Chan-Vese energy function and concurrently projects the segmenting surface into a linear subspace of training shapes. l1 normalization in (9) provides the appropriate subspace.

The first term of (9) is both convex and differentiable. The second term is convex, but not differentiable. Thus, unfortunately its gradient is not well defined. For an optimization problem with this structure, a class of algorithms called coordinate-wise optimization converges to the global optimum [28]. Here, the exemplary method includes adaptation of an algorithm of this class, called shooting algorithm [29], to work in conjunction with implicit surface evolution in the segmentation framework. In an abstract level, the method works by fixing all the entries of solution vector x except one, and optimizes the objective function along that dimension. That is, in each step, the method moves along a specific dimension and finds the optimum value for that specific entry.

To illustrate the method in more details, the following notations are introduced:

$$D = [\varphi_1 | \varphi_2 | \ldots | \varphi_n], x = [x_1, x_2, \ldots x_n],$$

$$D^{(-i)} = [\varphi_1 | \ldots | \varphi_{i-1} | \varphi_{i+1} | \ldots | \varphi_n],$$

$$x^{(-i)} = [x_1, \ldots, x_{i-1}, x_{i+1}, \ldots x_n].$$

The non-differentiable part of (9) can be separated into individual coordinate wise components, each of which can be solved directly by applying Karush-Kuhn-Tucker necessary conditions. By fixing the values of $x^{(-i)}$, the $i^{th}$ coordinate wise component of (9) is obtained by solving the following:

$$\operatorname*{argmin}_{x_i} \frac{1}{2} \|\phi_i - \varphi_i x_i\|_2^2 + \lambda |x_i| + \lambda \|x^{(-i)}\|_1; \lambda \geq 0, \quad (11)$$

where $\phi_i = \phi - D^{(-i)}(x)^{(-i)}$ is the error of the approximation computed when including all the atoms of the dictionary except $\varphi_i$. To find the best value for the coefficient $x_i$, (11) minimizes the error of approximation by adding the contribution of $\varphi_i$ to the linear approximation. Following the Karush-Kuhn-Tucker necessary conditions, the optimal solution is obtained as follows:

$$x_i^* = \begin{cases} \frac{(\phi_i^T \varphi_i - \lambda)}{\varphi_i^T \varphi_i}, & \text{if } \phi_i^T \varphi_i - \lambda > 0. \\ \frac{(\phi_i^T \varphi_i + \lambda)}{\varphi_i^T \varphi_i}, & \text{if } \phi_i^T \varphi_i + \lambda < 0. \\ 0, & \text{if } -\lambda \leq \phi_i^T \varphi_i \leq \lambda \end{cases} \quad (12)$$

Equation (12) simply computes the projection of error ($\phi_i$) onto the $i^{th}$ atom of the dictionary. If the size of this projection is in $[-\lambda, \lambda]$, $x_i$ is set to zero, otherwise its value is set to $$\frac{(\phi_i^T \varphi_i - \lambda)}{\varphi_i^T \varphi_i} \text{ or } \frac{(\phi_i^T \varphi_i + \lambda)}{\varphi_i^T \varphi_i}$$

depending on whether the projection is greater than λ or less than −λ. In summary, this method iteratively updates the objective function along one coordinate, while keeping other coordinates fixed. The exemplary method for image segmentation is illustrated in Algorithm 1. It incorporates the shooting method into level set evolution and forces the surface to separate homogeneous regions and at the same time keeps it similar to a linear combination of training shapes in the dictionary.

Algorithm 1 Image Segmentation by SCoTS

1: Initialize x randomly and φ by the SDF of a 5 × 5 square
2: while ||E(t + 1) − E(t)|| > Threshold do
3:     Compute approximation; $\tilde{\phi}$ = Dx
4:     update φ(t + 1) = φ(t) + α(σ) ($\tilde{\phi}$(t) − φ(t))
       + (1 − α(σ)) $V_{cv}$(t)
5:     for i = 1 : n do
6:         using current value of $x^{(-i)}$ solve (11).
7:         Suppose $x_i^*$ is the solution of (11), update $i^{th}$
          element of x to $x_i^*$.

-continued

Algorithm 1 Image Segmentation by SCoTS

8:     end for
9:     Compute number of non-zeros in x and update α(σ)
10: end while In this method, $\tilde{\phi}$ represents sparse approximation of the evolving surface. The shape prior weighting function $\alpha(\sigma)$ determines the level of trust in the shape prior and is a function of sparsity (10). The method consists of two nested loops. In the outer loop the segmenting surface gets updated in the direction of a linear combination of Chan-Vese and sparse shape prior terms. The inner loop refines the updated shape and brings it in to the valid shape space.

Convergence: The stopping criterion for the exemplary method is based on the change in the energy of the segmenting surface. If the energy does not change from one iteration to the next, the method stops. We define the energy function as the sum of the Chan-Vese energy function and the computed sparse linear approximation.

$$E(\phi(t), x(t)) = E_{cv}(\phi(t)) + E_{sp}(\phi(t), x(t)). \quad (13)$$

$E_{cv}$, is the Chan-Vese energy function and $E_{sp}$ is the energy term defined in (9). Although convergence of the method cannot be mathematically proven, it has been empirically observed that as long as the evolving surface is roughly initialized at the center of the nodule, the method converges.

Time complexity: the method complexity is a function of Chan-Vese and shape approximation complexity. In each iteration of the outer loop, one iteration of Chan-Vese, as well as n iterations of the inner loop are applied. The inner loop solves (11) through conditions provided in (12).

However, as pointed out in [30], all the required values of $\phi_i^T \phi_i$ and $\varphi_i^T \varphi_i$ for (12) can be pre-computed before starting the inner loop. Thus, since the complexity of Chan-Vese in each iteration is O(N×M×P), where N×M×P is the size of the image, the complexity of one iteration of the exemplary method is O(N×M×P+n), where n is the total number of shapes in the dictionary.

Experimental Results

The exemplary method has been validated on a subset of data from the lung image database consortium image collection (LIDC-IDRI) [31], [32]. In LIDC-IDRI, each dataset is a breath-held 3D CT image of the thorax with size 512×512. The number of slices varying between 95 and 672 and the in-plane pixel size varies between 0.5 and 0.8 mm/pixel. The range for the kVp for these data was 120-140 with 120 as the average and 20.99 as the standard deviation. The range for the mA was 30-634 with 215.9 as the average and 145.1 as the standard deviation. The LIDC-IDRI contains lung CT scans from 1018 patients with nodule annotations provided by four experienced radiologists. It should be noted that the 4 radiologists who delineated the LIDC data differ between cases so that not the same 4 individuals read and delineated all data. Therefore, it should keep in mind that "radiologist j's delineations" (j=1, . . . , 4) can be from a number of individual radiologists. Since nodules of size less than 3 mm are considered inconsequential, for this validation only data with nodule size greater than or equal to 3 mm in diameter is included. Furthermore, those nodules that were in common among all four radiologists were selected. This left 542 nodules that fit inside predefined cubic volumes.

The exemplary method works on a region of interest (ROI) with size 75×85×45 with the nodule approximately centered. The approach to selection of the ROI was to keep the ROI size (in voxels) large enough to include all the nodules in the dataset. The size of all nodules as delineated by radiologists were extracted, and the number of voxels they occupy in each dimension was determined for the dataset. The largest number of voxels occupied for all nodules was 71 in the first dimension, 80 in the second dimension and 35 in the third dimension. 75×85×45 was selected for the size of the ROI to ensure that all nodules delineated by all radiologists would fit inside the ROI.

The method's parameters were determined through optimization of the Dice Similarity Coefficient (DSC) for samples of the three nodule classes: well-circumscribed, juxta-pleural, and juxta-vascular. Following this approach, parameter values in TABLE 1 were derived.

TABLE 1

The method parameters values used for all experiments

| Parameter | Value |
| --- | --- |
| k1 | 0:2 |
| k2 | 0 |
| k3 | 5 |
| k4 | 5 |
| λ | 150 |

In applying the segmentation method, a point at the center of nodule is selected manually around which a 5×5 square was prescribed as the zero level set of an SDF which iteratively evolved into a 3D shape and into neighboring slices.

Figure 10:
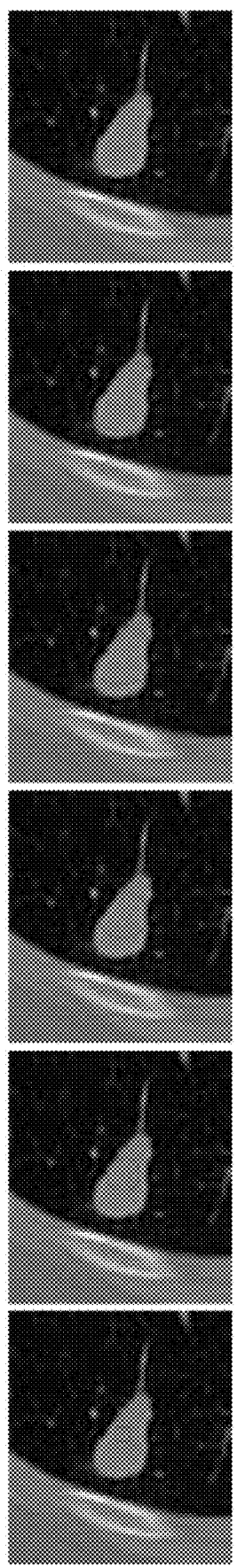
FIG. 10 is a series of image slices and schematic representations of surface and shape prior evolution according to a first experimental result.
Figure 10:
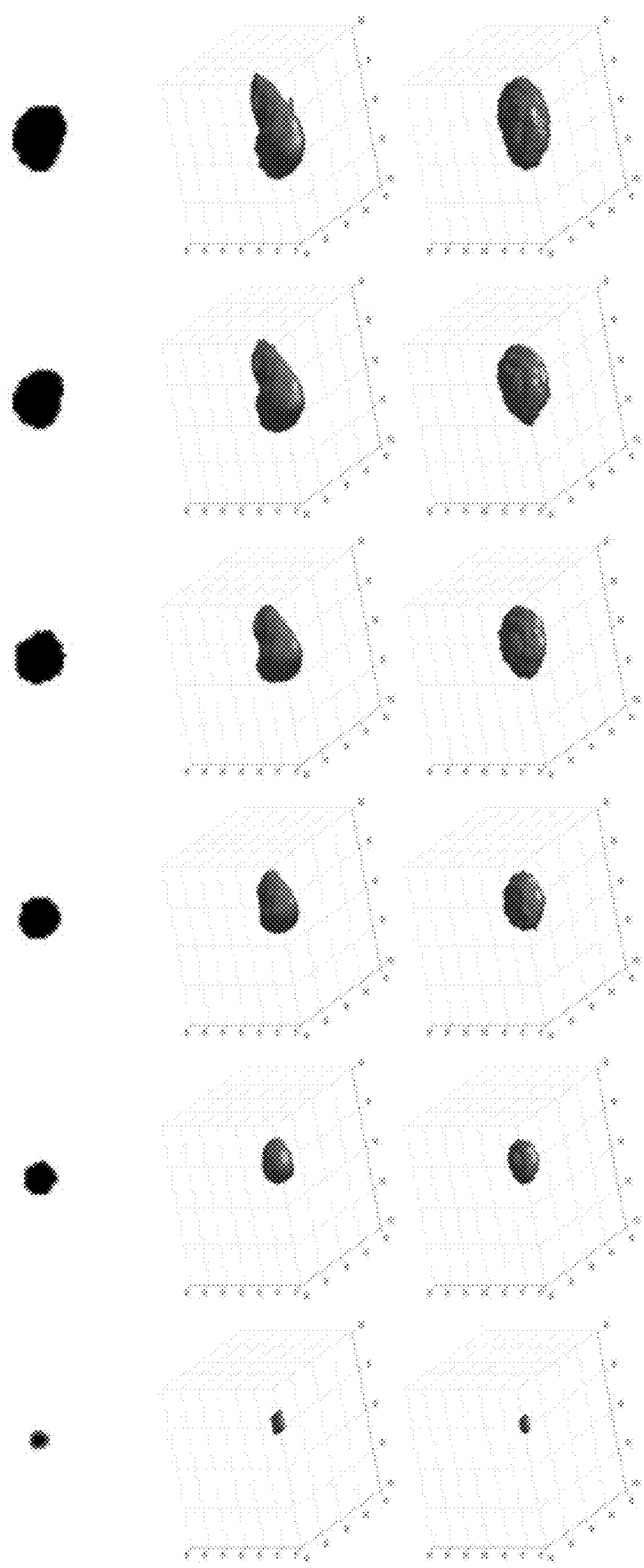

The first experiment, illustrated in FIG. 10, demonstrates the surface and shape evolution through different steps. The first column corresponds to the initialization. Columns 2-6 show iterations 6, 13, 20, 27, and the final result in iteration 50. First and third row show the segmentation in 2D and 3D respectively and second and fourth rows show the zero level set of approximated shape prior in 2D and 3D. As the segmenting surface evolves, the shape prior changes and adapts itself to the segmenting surface. For this experiment, each iteration of the method approximately took 7.3 seconds of CPU time in MATLAB on an AMD 3.9 GHz with 32 GB RAM of memory. The method converged after 50 iterations and segmented the volume in 6 minutes.

The approach adopted to validation is 10 fold cross validation. That is, 542 delineated nodules were divided into 10 groups (folds). The SDFs of shapes corresponding to the nodules of 9 folds served as the atoms of the dictionary and the method was tested on nodules in the 10th fold. The testing fold was successively changed between the 10 groups, each providing a different segmentation accuracy.

Figure 11:
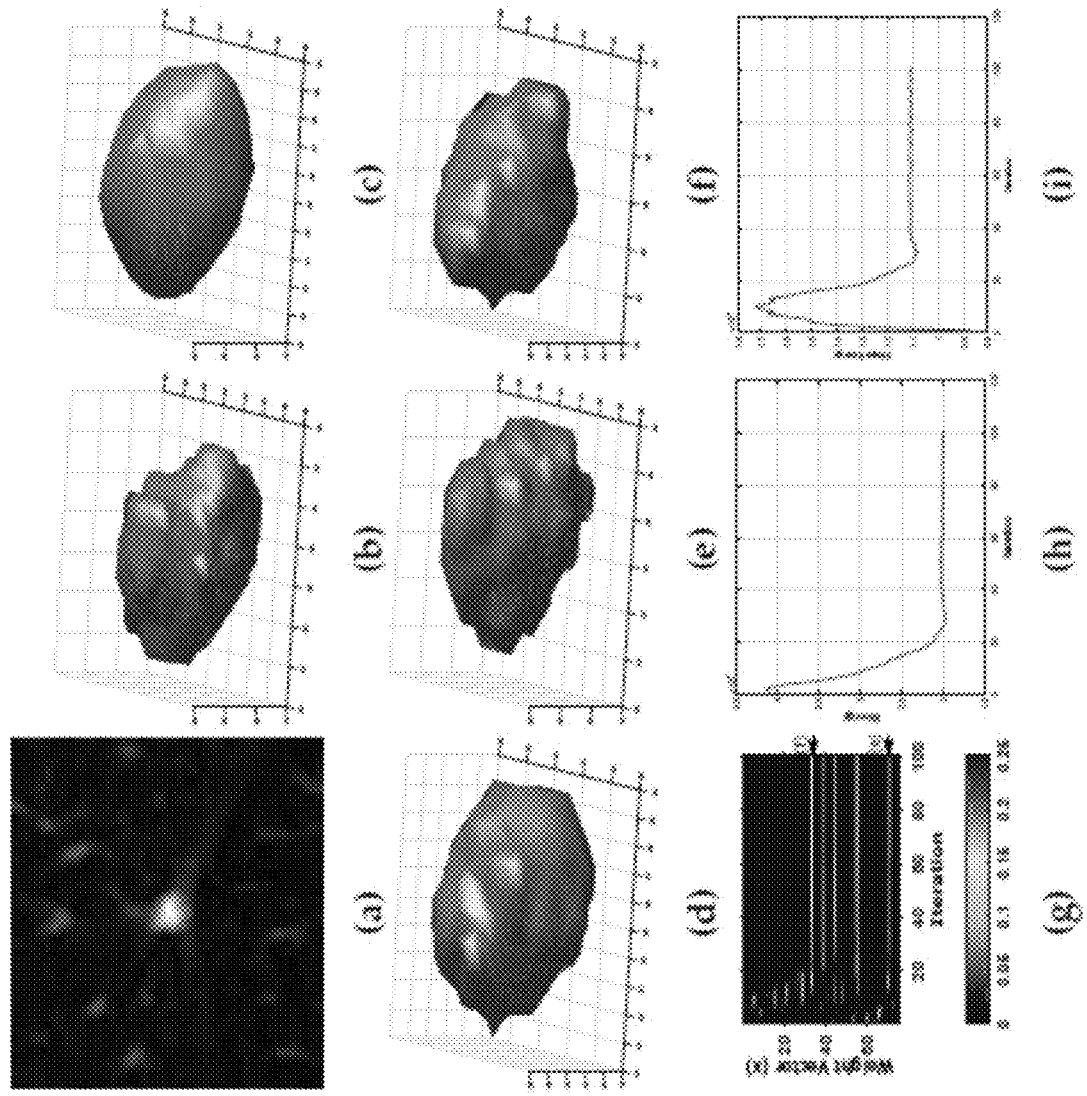
FIG. 11 is a series of an image slice, a schematic representation, and graphs of a second experimental result.

A second result is used to demonstrate the evolution and convergence of the sparse representation. Part (a) of FIG. 11 shows a mid slice of an input nodule superimposed with a segmentation surface plotted in red. Part (b) of FIG. 11 shows this nodule in three dimensions delineated by the radiologist. Part (c) of FIG. 11 shows the final segmenting surface. Shape prior constructed from dictionary atoms is shown in part (d) of FIG. 11, and parts (e) and (f) of FIG. 11 represent two shapes from the dictionary that had significant contribution in building the shape prior. Part (g) of FIG. 11 shows the evolution of vector x (equation (6)) over 100 iterations of the method. Every iterative update of vector x is stored as a column of a matrix with increasing iterations going from left to right. Small entries are shown in blue and for some the color shifts towards red as the iterations and values increase. For the sake of simplicity only those entries of vector x that changed were shown in this figure. For the first 20 iterations, selected atoms varying from one iteration to another. Subsequently, the method promotes few atoms, two of which were shown in part (e) and part (f). This result is quite typical for the method in that any valid nodule shape can be represented by 1-3% of the shape atoms in the dictionary. In part (h) of FIG. 11 the total energy (equation (13)) is plotted over 100 iterations. The plot shows that the total energy converges and does not change significantly after 30 iterations. Finally, in part (i) of FIG. 11, shape energy is presented. Initially, the shape energy oscillates with no apparent intention to converge. However, once the evolving surface forms a nodule boundary structure, the shape energy starts to decrease, resulting in convergence.

Figure 12:
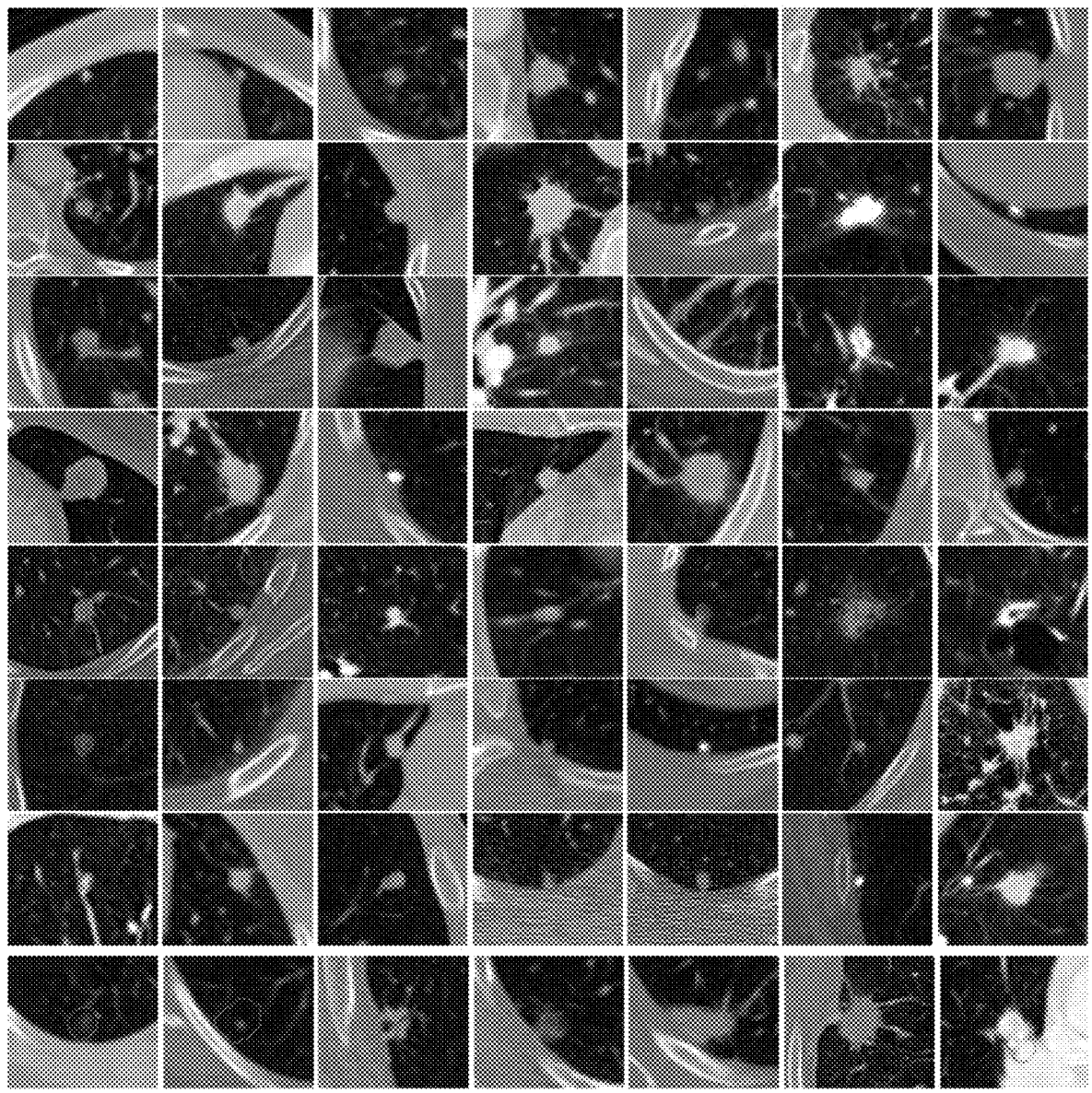
FIG. 12 is a series of image slices of samples of LIDC-IDRI dataset with results of segmentation according to the invention superimposed thereon.

FIG. 12 shows segmentation of some samples of the LIDC-IDRI dataset. It demonstrates how the exemplary method can distinguish the nodule from the surrounding tissues like vessel or pleura. It can be seen that when the nodule is not spherical, the exemplary method can still capture the nodule. The last row in this figure shows samples for which the exemplary method did not generate satisfactory results.

The reason behind the failures maybe attributed to the fact that the framework is general and tries to segment all types of nodules. Failures mostly happen in situations where the nodules are attached to organs with similar HUs and at the same time the shape prior of the nodule cannot be sparsely reconstructed from the dictionary. As a result, the shape prior energy is dominated by Chan-Vese energy function and the segmenting surface leaks into adjacent regions. Another type of failure is related to very small and non-solid textured nodules which pose difficulty for Chan-Vese algorithm to grow properly. For such cases, the segmentation stops by shape prior approximation (see last row of FIG. 12).

The accuracy of segmentation is measured based on the Dice similarity coefficient (DSC) and True Positive Rate (TPR):

$$DSC = \frac{2N(A \cap B)}{N(A) + N(B)}, TPR = \frac{TP}{TP + FN}, \quad (14)$$

where in (14), A denotes the set of voxels classified by the exemplary method to belong to the lung nodule, B is the ground truth from manual delineation, N(V) is the voxel count in the set V, TP is the number of nodule voxels correctly segmented by the exemplary method, and FN represents the number of nodule voxels mistakingly segmented as background. Other numerical metrics used herein are the Jaccard index (J) and False Positive Rate (FPR):

$$J = \frac{N(A \cap B)}{N(A \cup B)} = \frac{DSC}{2 - DSC}, FPR = \frac{FP}{FP + TN}. \quad (15)$$

FP is the number of non-nodule voxels mistakingly segmented as belonging to the nodule and TN is the number of non-nodule voxels that are correctly segmented.

TABLE 2

Numerical Validation of the Method

|  | Radiologist 1 | Radiologist 2 | Radiologist 3 | Radiologist 4 |
| --- | --- | --- | --- | --- |
| SCoTS | DSC = 0.72 ± 0.15 | DSC = 0.71 ± 0.17 | DSC = 0.72 ± 0.16 | DSC = 0.71 ± 0.17 |
|  | TPR = 0.77 ± 0.16 | TPR = 0.8 ± 0.16 | TPR = 0.77 ± 0.17 | TPR = 0.78 ± 0.16 |
| Radiologist 1 | DSC = 1 | DSC = 0.79 ± 0.09 | DSC = 0.80 ± 0.10 | DSC = 0.79 ± 0.10 |
|  | TPR = 1 | TPR = 0.85 ± 0.13 | TPR = 0.84 ± 0.13 | TPR = 0.82 ± 0.13 |
| Radiologist 2 | DSC = 0.79 ± 0.09 | DSC = 1 | DSC = 0.81 ± 0.10 | DSC = 0.79 ± 0.10 |
|  | TPR = 0.78 ± 0.14 | TPR = 1 | TPR = 0.81 ± 0.15 | TPR = 0.79 ± 0.14 |
| Radiologist 3 | DSC = 0.80 ± 0.10 | DSC = 0.81 ± 0.10 | DSC = 1 | DSC = 0.79 ± 0.10 |
|  | TPR = 0.79 ± 0.14 | TPR = 0.84 ± 0.14 | TPR = 1 | TPR = 0.80 ± 0.14 |
| Radiologist 4 | DSC = 0.79 ± 0.10 | DSC = 0.79 ± 0.10 | DSC = 0.79 ± 0.10 | DSC = 1 |
|  | TPR = 0.79 ± 0.16 | TPR = 0.83 ± 0.15 | TPR = 0.82 ± 0.14 | TPR = 1 |

In TABLE 2, Row 1 column j reports the numerical validation of the method (DSC, TPR, FPR) on 542 nodule CT dataset using Radiologist j's delineations for both training and testing with 10 fold cross validation. Reported in rows 2, 3, 4, and 5 column j are the DSC and TPR for radiologists 1, 2, 3, and 4, using radiologist j delineations as ground truth—clearly no training or cross-validation is required for rows labeled as "Radiologist j". When rounded to the nearest hundredth, for all cases FPR was zero and therefore has not been included in the table.

In TABLE 2 the segmentation accuracy of SCoTS with respect to each radiologists' delineations is reported separately. This is because each expert interprets the lesion boundaries differently and consequently delineates the lesion differently. The first row of TABLE 2 (column j) reports the accuracy while radiologist j's delineations was used to build the dictionary. Subsequently, 10 fold cross validation was performed based on radiologist j's boundary delineation. The average DSC and TPR for each of the 10 testing folds were averaged in order to produce the entries in the first row of the table. In order to compare radiologists' delineation with respect to each other, four more rows have been included in TABLE 2. For these rows, the radiologists' delineations in column j were used as the ground truth for direct comparison since no training or cross validation was involved.

Although in TABLE 2 the segmentation accuracies are very close to one another, the segmented nodules are not identical and in some cases even dissimilar.

Figure 13:
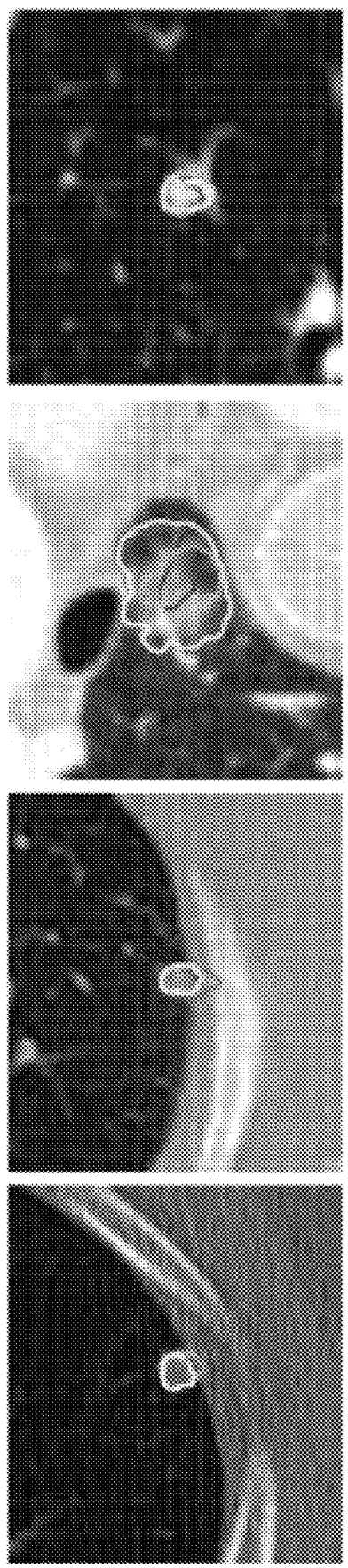
FIG. 13 is a collection of four image slices with results of segmentation using dictionaries constructed from different experts' delineations superimposed thereon.

FIG. 13 shows four images in which dictionaries constructed from different experts' delineations produced significantly different segmented surfaces. In this figure, red, blue, green, and yellow curves identify the final segmentation produced by a dictionary constructed from nodules delineated by radiologist number 1, 2, 3, and 4 respectively. This behavior suggests the possibility of combining the results in a consensus manner where the segmented surfaces obtained by each dictionary are fused by an aggregation method such as [33] to provide higher accuracies.

TABLE 3

Performance of SCoTS on Well-Circumscribed Nodules

|  | Radiologist 1 | Radiologist 2 | Radiologist 3 | Radiologist 4 |
|---|---|---|---|---|
| SCoTS | DSC = 0.75 ± 0.14 | DSC = 0.75 ± 0.13 | DSC = 0.75 ± 0.13 | DSC = 0.75 ± 0.13 |
|  | TPR = 0.78 ± 0.17 | TPR = 0.79 ± 0.15 | TPR = 0.77 ± 0.17 | TPR = 0.79 ± 0.16 |
| Radiologist 1 | DSC = 1 | DSC = 0.79 ± 0.10 | DSC = 0.79 ± 0.11 | DSC = 0.78 ± 0.10 |
|  | TPR = 1 | TPR = 0.83 ± 0.15 | TPR = 0.82 ± 0.15 | TPR = 0.81 ± 0.15 |
| Radiologist 2 | DSC = 0.79 ± 0.10 | DSC = 1 | DSC = 0.80 ± 0.10 | DSC = 0.79 ± 0.10 |
|  | TPR = 0.78 ± 0.15 | TPR = 1 | TPR = 0.82 ± 0.15 | TPR = 0.80 ± 0.15 |
| Radiologist 3 | DSC = 0.79 ± 0.11 | DSC = 0.80 ± 0.10 | DSC = 1 | DSC = 0.78 ± 0.10 |
|  | TPR = 0.79 ± 0.15 | TPR = 0.83 ± 0.14 | TPR = 1 | TPR = 0.80 ± 0.15 |
| Radiologist 4 | DSC = 0.78 ± 0.10 | DSC = 0.79 ± 0.10 | DSC = 0.78 ± 0.10 | DSC = 1 |
|  | TPR = 0.79 ± 0.15 | TPR = 0.82 ± 0.15 | TPR = 0.81 ± 0.15 | TPR = 1 |

TABLE 4

Performance of SCoTS on Juxta-Vascular Nodules

|  | Radiologist 1 | Radiologist 2 | Radiologist 3 | Radiologist 4 |
|---|---|---|---|---|
| SCoTS | DSC = 0.73 ± 0.14 | DSC = 0.73 ± 0.13 | DSC = 0.72 ± 0.16 | DSC = 0.73 ± 0.14 |
|  | TPR = 0.74 ± 0.16 | TPR = 0.73 ± 0.16 | TPR = 0.70 ± 0.19 | TPR = 0.73 ± 0.16 |
| Radiologist 1 | DSC = 1 | DSC = 0.79 ± 0.10 | DSC = 0.79 ± 0.10 | DSC = 0.77 ± 0.12 |
|  | TPR = 1 | TPR = 0.87 ± 0.12 | TPR = 0.85 ± 0.11 | TPR = 0.83 ± 0.12 |
| Radiologist 2 | DSC = 0.79 ± 0.10 | DSC = 1 | DSC = 0.80 ± 0.10 | DSC = 0.78 ± 0.12 |
|  | TPR = 0.76 ± 0.16 | TPR = 1 | TPR = 0.81 ± 0.15 | TPR = 0.79 ± 0.15 |
| Radiologist 3 | DSC = 0.79 ± 0.10 | DSC = 0.80 ± 0.10 | DSC = 1 | DSC = 0.79 ± 0.10 |
|  | TPR = 0.78 ± 0.16 | TPR = 0.84 ± 0.14 | TPR = 1 | TPR = 0.80 ± 0.13 |
| Radiologist 4 | DSC = 0.77 ± 0.12 | DSC = 0.78 ± 0.12 | DSC = 0.79 ± 0.10 | DSC = 1 |
|  | TPR = 0.77 ± 0.18 | TPR = 0.83 ± 0.17 | TPR = 0.82 ± 0.15 | TPR = 1 |

TABLE 5

Performance of SCoTS on Juxta-Pleural and Pleural Nodules

|  | Radiologist 1 | Radiologist 2 | Radiologist 3 | Radiologist 4 |
|---|---|---|---|---|
| SCoTS | DSC = 0.64 ± 0.20 | DSC = 0.62 ± 0.23 | DSC = 0.64 ± 0.20 | DSC = 0.63 ± 0.22 |
|  | TPR = 0.78 ± 0.17 | TPR = 0.78 ± 0.18 | TPR = 0.77 ± 0.17 | TPR = 0.78 ± 0.17 |
| Radiologist 1 | DSC = 1 | DSC = 0.80 ± 0.09 | DSC = 0.80 ± 0.10 | DSC = 0.79 ± 0.09 |
|  | TPR = 1 | TPR = 0.84 ± 0.13 | TPR = 0.83 ± 0.13 | TPR = 0.81 ± 0.12 |
| Radiologist 2 | DSC = 0.80 ± 0.09 | DSC = 1 | DSC = 0.80 ± 0.11 | DSC = 0.80 ± 0.09 |
|  | TPR = 0.79 ± 0.13 | TPR = 1 | TPR = 0.81 ± 0.13 | TPR = 0.80 ± 0.13 |
| Radiologist 3 | DSC = 0.80 ± 0.10 | DSC = 0.80 ± 0.11 | DSC = 1 | DSC = 0.78 ± 0.11 |
|  | TPR = 0.80 ± 0.12 | TPR = 0.83 ± 0.15 | TPR = 1 | TPR = 0.79 ± 0.14 |
| Radiologist 4 | DSC = 0.79 ± 0.09 | DSC = 0.80 ± 0.09 | DSC = 0.78 ± 0.11 | DSC = 1 |
|  | TPR = 0.80 ± 0.14 | TPR = 0.83 ± 0.14 | TPR = 0.82 ± 0.14 | TPR = 1 |

To evaluate how SCoTS performs on different nodule classes, the relevant DSC and TPR values were evaluated on different nodule classes and results are reported in TABLES 3-5. In preparing these results, a thoracic radiologist (Dr. Seow) further classified the nodules in the LIDC-IDRI data. It turned out 209 nodules in the selected subset of LIDC-IDRI are well-circumscribed and 178 nodules are juxtavascular. This number for juxta-pleural and pleural tail combined is 155. Since only a small fraction of nodules were classified as pleural tail, in TABLE 5, these were combined with juxta-pleural nodules. Also, for nodules that were labeled as both juxta-vascular and juxta-pleural, they were considered as juxta-pleural as they are more challenging. Similar to TABLE 2, dictionary construction and ground truth alternates between four radiologists in a round robin fashion. Comparing the results in TABLES 3-5, it can be seen SCoTS performance is best on well-circumscribed nodules, and lowest in juxta-pleural/pleural tail nodules. This is not surprising because these are the least and most challenging cases respectively. Another observation is that no matter which radiologist's delineations were used to construct the dictionary, SCoT's performance is similar on well-circumscribed nodules. Variability in performance is visible in TABLE 5. Also, comparing the radiologists' delineations with respect to each other (last four rows of TABLES 3-5), reveals that accuracy of radiologists' delineations are unrelated to the class of nodules.

TABLE 6

Comparison of Performance of SCoTS with Previously Proposed Nodule Segmentation Methods

|  | TPR(%) | FPR(%) | J |
|---|---|---|---|
| SCoTS | 90.26 ± 11.42 | 0.3 ± 0.5 | 0.57 ± 0.16 |
| MRFC-OB [16] | 95.50 ± 7.86 | N/A | N/A |
| Cavalcanti et al. [17] | 93.53 | 0.89 | N/A |
| SCoTS (JV) | 88.91 ± 11.74 | 0.13 ± 0.46 | 0.57 ± 0.14 |
| Chen et al. [12] | 88.89 | 10.19 | N/A |
| SCoTS (non/part-solid) | 81.73 ± 23.57 | 0.9 ± 1.2 | 0.36 ± 0.23 |
| Lassen et al. [14] | N/A | N/A | 0.50 ± 0.14 |

TABLE 6 compares results of SCoTS to other nodule segmentation methods which have been tested on the LIDC- IDRI database. The dataset used in [16] is the same dataset used herein. The other methods used other subsets of LIDC-IDRI. To compare the current results with [16], a voxel probability map metric used in [16] was calculated for SCoTS. The map is computed for each voxel c of the nodule as follows: if all radiologists classify c as being part of the nodule, then the Mpr(c)=100%. At the other extreme, if c is not assigned a nodule label by any of the radiologists, then MPR(c)=0%. Based on this definition, TPR is defined as true positive rate computed with Mpr(c)=100% as ground truth. Further details about this metric can be found in [16]. TABLE 6 compares the segmentation accuracies based on TPR and Jaccard index (J) defined in equation (15). Despite the fact that results in [16] are better than SCoTS, in [16] each nodule class is treated separately with a different segmentation approach. In [16] after applying Otsu thresholding, a connectivity analysis was done to determine the nodule type, separating juxta-vascular and well-circumscribed nodules from juxta-pleural and pleural tail nodules. Attached tissues were separated from pleural tail or pleural surface either by morphological operations or a thickening method. However, SCoTS extracts the nodule shape by sparse representation and without any preprocessing or classification step in advance. Also, the method proposed in [17] needs an ROI as the input to the method, used as a reference slice for background without nodule tissue. From this point of view, the proposed method is more general since it does not require the user to provide nearest slice to lesion.

The performance of the SCoTS on juxta-vascular nodules (SCoTS (JV)) is also shown in TABLE 6. It compares the method with results in [12] is only applicable to juxtavascular nodules. Despite the close accuracy, the method in [12] is applicable to juxta-vascular nodules and in this sense less general than the method proposed in this paper.

The last two rows of TABLE 6 compare the performance of SCoTS on non-solid and part-solid nodules. This classification may be found in the LIDC XML Base Schema [34], where each radiologist rated the lesions related to in several categories including texture. The texture was classified from (1-5), where label 5 indicates solid nodules, label 3 corresponds to part-solid, and label 1 represents nonsolid nodules. From the selected dataset, nodules were chosen for which more than one radiologist's rating was part-solid or non-solid. The selected subset contained 37 samples which met this criterion. It can be seen that SCoTS does not perform well on non-solid and part-solid nodules. The main reason for this diminished performance lies in the Chan-Vese energy function and not shape prior energy. The Chan-Vese algorithm tries to separate homogeneous regions from ROI while the non-solid nodules have inhomogeneous appearance and pose difficulty for SCoTS. However, it should be noted that the algorithm in [14] requires additional manual steps as the user is required to draw the largest diameter of the nodule.

CONCLUSION

A general framework for segmentation of anatomical shapes with application to different classes of lung nodules was presented. The method incorporates shape prior information within a sparse representation framework for active contours segmentation of lung nodules. The discriminative nature of sparse representation, which was used to model new shapes, helped limit shape variations to a valid shape space represented by training data. On average, the proposed method produced results which were competitive with manual delineation by four experienced radiologists.

The experimental results showed that despite the generality of the method, the method can work for different types of nodules; well-circumscribed, juxta-vascular, juxtapleural, and pleural tail, achieving performance metrics close to previously published methods which were developed for segmentation of specific nodule types or required classification of nodules in advance. In comparison to prior publications, performance of SCoTS on non-solid and part-solid nodules was less competitive mainly due to the inhomogeneous texture of these nodules.

As a final note, it is believed that although in this paper SCoTS was applied to nodule shape segmentation, it should prove general and applicable to a wide variety of medical image segmentation problems.

It will be understood that various details of the presently disclosed subject matter can be changed without departing from the scope of the subject matter disclosed and claimed herein.

Furthermore, the foregoing description is for the purpose of illustration only, and not for the purpose of limitation.

REFERENCES

Throughout this document, various references are cited. All such references are incorporated herein by reference, including the references set forth in the following list:

[1] A. L. Association et al., "Lung cancer fact sheet," 4, http://www.lung.org/lung-disease/lungcancer/resources/facts-figures/lung-cancerfact-sheet.html, Dec. 8, 2013, p. 1, 2014.

[2] W. J. Kostis, A. P. Reeves, D. F. Yankelevitz, and C. I. Henschke, "Three-dimensional segmentation and growth-rate estimation of small pulmonary nodules in helical CT images," IEEE transactions on medical imaging, vol. 22, no. 10, pp. 1259-1274, 2003.

[3] A. P. Reeves, A. B. Chan, D. F. Yankelevitz, C. I. Henschke, B. Kressler, and W. J. Kostis, "On measuring the change in size of pulmonary nodules," IEEE Trans. Med. Imaging, vol. 25, no. 4, pp. 435-450, 2006.

[4] K. Murphy, B. van Ginneken, A. M. Schilham, B. De Hoop, H. Gietema, and M. Prokop, "A large-scale evaluation of automatic pulmonary nodule detection in chest CT using local image features and k-nearest-neighbour classification," Medical Image Analysis, vol. 13, no. 5, pp. 757-770, 2009.

[5] A. A. Farag, H. E. A. El Munim, J. H. Graham, and A. A. Farag, "A novel approach for lung nodules segmentation in chest CT using level sets," IEEE Transactions on Image Processing, vol. 22, no. 12, pp. 5202-5213, 2013.

[6] T. W. Way, L. M. Hadjiiski, B. Sahiner, H.-P. Chan, P. N. Cascade, E. A. Kazerooni, N. Bogot, and C. Zhou, "Computer-aided diagnosis of pulmonary nodules on CT scans: segmentation and classification using 3D active contours," Medical Physics, vol. 33, no. 7, pp. 2323-2337, 2006.

[7] J. Dehmeshki, H. Amin, M. Valdivieso, and X. Ye, "Segmentation of pulmonary nodules in thoracic CT scans: a region growing approach," IEEE transactions on medical imaging, vol. 27, no. 4, pp. 467-480, 2008.

[8] X. Ye, G. Beddoe, and G. Slabaugh, "Automatic graph cut segmentation of lesions in CT using mean shift superpixels," Journal of Biomedical Imaging, vol. 2010, p. 19, 2010.

[9] J. won Cha, M. M. Farhangi, N. Dunlap, and A. Amini, "4D lung tumor segmentation via shape prior and motion cues," in Engineering in Medicine and Biology Society (EMBC), 2016 IEEE 38$^{th}$ Annual International Conference of the. IEEE, 2016, pp. 1284-1287.
[10] S. Mukhopadhyay, "A segmentation framework of pulmonary nodules in lung CT images," Journal of digital imaging, vol. 29, no. 1, pp. 86-103, 2016.
[11] S. Diciotti, S. Lombardo, M. Falchini, G. Picozzi, and M. Mascalchi, "Automated segmentation refinement of small lung nodules in CT scans by local shape analysis," IEEE Transactions on Biomedical Engineering, vol. 58, no. 12, pp. 3418-3428, 2011.
[12] K. Chen, B. Li, L.-f. Tian, W.-b. Zhu, and Y.-h. Bao, "Vessel attachment nodule segmentation using integrated active contour model based on fuzzy speed function and shape-intensity joint bhattacharya distance," Signal Processing, vol. 103, pp. 273-284, 2014.
[13] J. H. Moltz, J.-M. Kuhnigk, L. Bornemann, and H. Peitgen, "Segmentation of juxtapleural lung nodules in ct scan based on ellipsoid approximation," in Proceedings of First International Workshop on Pulmonary Image Processing. New York, 2008, pp. 25-32.
[14] B. Lassen, C. Jacobs, J. Kuhnigk, B. van Ginneken, and E. van Rikxoort, "Robust semi-automatic segmentation of pulmonary subsolid nodules in chest computed tomography scans," Physics in medicine and biology, vol. 60, no. 3, p. 1307, 2015.
[15] J.-M. Kuhnigk, V. Dicken, L. Bornemann, A. Bakai, D. Wormanns, S. Krass, and H.-O. Peitgen, "Morphological segmentation and partial volume analysis for volumetry of solid pulmonary lesionsin thoracic CT scans," IEEE transactions on medical imaging, vol. 25, no. 4, pp. 417-434, 2006.
[16] P. Badura and E. Pietka, "Soft computing approach to 3D lung nodule segmentation in CT," Computers in biology and medicine, vol. 53, pp. 230-243, 2014.
[17] P. G. Cavalcanti, S. Shirani, J. Scharcanski, C. Fong, J. Meng, J. Castelli, and D. Koff, "Lung nodule segmentation in chest computed tomography using a novel background estimation method," Quantitative imaging in medicine and surgery, vol. 6, no. 1, p. 16, 2016.
[18] B. Van Ginneken, "Supervised probabilistic segmentation of pulmonary nodules in CT scans," in International Conference on Medical Image Computing and Computer-Assisted Intervention. Springer, 2006, pp. 912-919.
[19] J. Wright, A. Y. Yang, A. Ganesh, S. S. Sastry, and Y. Ma, "Robust face recognition via sparse representation," IEEE transactions on pattern analysis and machine intelligence, vol. 31, no. 2, pp. 210-227, 2009.
[20] S. Zhang, Y. Zhan, M. Dewan, J. Huang, D. N. Metaxas, and X. S. Zhou, "Towards robust and effective shape modeling: Sparse shape composition," Medical image analysis, vol. 16, no. 1, pp. 265-277, 2012.
[21] M. M. Farhangi, H. Frigui, R. Bert, and A. A. Amini, "Incorporating shape prior into active contours with a sparse linear combination of training shapes: Application to corpus callosum segmentation," in Engineering in Medicine and Biology Society (EMBC), 2016 IEEE 38th Annual International Conference of the. IEEE, 2016, pp. 6449-6452.
[22] T. F. Chan and L. A. Vese, "Active contours without edges," IEEE Transactions on image processing, vol. 10, no. 2, pp. 266-277, 2001.
[23] V. Caselles, R. Kimmel, and G. Sapiro, "Geodesic active contours," International journal of computer vision, vol. 22, no. 1, pp. 61-79, 1997.
[24] S. Osher and J. A. Sethian, "Fronts propagating with curvature-dependent speed: algorithms based on hamilton-jacobi formulations," Journal of computational physics, vol. 79, no. 1, pp. 12-49, 1988.
[25] M. E. Leventon, W. E. L. Grimson, and O. Faugeras, "Statistical shape influence in geodesic active contours," in Computer Vision and Pattern Recognition, 2000. Proceedings. IEEE Conference on, vol. 1. IEEE, 2000, pp. 316-323.
[26] D. Cremers, S. J. Osher, and S. Soatto, "Kernel density estimation and intrinsic alignment for shape priors in level set segmentation," International Journal of Computer Vision, vol. 69, no. 3, pp. 335-351, 2006.
[27] D. L. Donoho, "For most large underdetermined systems of linear equations the minimal 1-norm solution is also the sparsest solution," Communications on pure and applied mathematics, vol. 59, no. 6, pp. 797-829, 2006.
[28] P. Tseng et al., Coordinate ascent for maximizing non-differentiable concave functions. Massachusetts Institute of Technology, Laboratory for Information and Decision Systems, 1988.
[29] W. J. Fu, "Penalized regressions: the bridge versus the lasso," Journal of computational and graphical statistics, vol. 7, no. 3, pp. 397-416, 1998.
[30] M. Schmidt, "Least squares optimization with l1-norm regularization," CS542B Project Report, pp. 14-18, 2005. [Online]. Available: http://people.duke.edu/hpgavin/SystemID/References/Schmidt-LASSO-2005.pdf
[31] S. G. Armato III, G. McLennan, L. Bidaut, M. F. McNitt-Gray, C. R. Meyer, A. P. Reeves, B. Zhao, D. R. Aberle, C. I. Henschke, E. A. Hoffman et al., "The lung image database consortium (LIDC) and image database resource initiative (IDRI): a completed reference database of lung nodules on CT scans," Medical physics, vol. 38, no. 2, pp. 915-931, 2011.
[32] K. Clark, B. Vendt, K. Smith, J. Freymann, J. Kirby, P. Koppel, S. Moore, S. Phillips, D. Maffitt, M. Pringle et al., "The cancer imaging archive (tcia): maintaining and operating a public information repository," Journal of digital imaging, vol. 26, no. 6, pp. 1045-1057, 2013.
[33] S. K. Warfield, K. H. Zou, and W. M. Wells, "Simultaneous truth and performance level estimation (STAPLE): an algorithm for the validation of image segmentation," IEEE transactions on medical imaging, vol. 23, no. 7, pp. 903-921, 2004.
[34] LIDC xml base schema 2011. [Online]. Available: https://wiki.cancerimagingarchive.net/display/Public/LIDCIDRI

What is claimed is:

1. A method of automated segmentation of an anatomical object through learned examples, comprising:
receiving, by a processing device, an image of the anatomical object;
roughly aligning a shape of the anatomical object by determining a center of a Signed Distance Function (SDF) of the shape and applying an intrinsic alignment method to align the shape with a center of a selected reference shape;
vectorizing and storing SDFs ($\varphi_i$; i=1; . . . , n) of all training shapes in columns of a matrix D=[$\varphi_1$|$\varphi_2$| . . . |$\varphi_n$|] $\in \mathbb{R}^{m \times n}$ defined as a dictionary, with each column defined as an atom, m defined as a number of voxels in each training shape image, and n defined as a size (number) of training shapes, such that a shape SDF $\phi \in \mathbb{R}^m$ may be approximated as $$\phi \approx \tilde{\phi}(x) = Dx, \qquad (6)$$

where x $\in \mathbb{R}^n$ is a weight vector which determines the contribution of each training shape in modeling the shape $\phi$;

determining a sparse representation of the roughly aligned shape of the anatomical object by iteratively evolving a segmenting surface as a combination of a level set segmentation and a linear combination of training shapes; and outputting, to an output device, the sparse representation of the shape of the anatomical object as the segmentation of the anatomical object.

2. The method of claim 1, wherein determining a sparse representation of the shape of the anatomical object comprises:

defining an objective function which minimizes an error between the shape of the anatomical object and the shape of the evolving surface;

initializing x randomly and $\phi$ as the shape SDF at substantially the center of the anatomical object in the image;

while an energy of the evolving segmenting surface of a subsequent iteration changes more than a threshold amount over an energy of the evolving segmenting surface of a previous iteration, then:

determining a sparse approximation of the evolving surface;

updating the evolving surface as the combination of the level set segmentation and the linear combination of training shapes, the combination weighted by a sparsity of the linear combination of training shapes; and refining the updated evolving surface by iteratively updating the objective function along one coordinate while keeping all other coordinates fixed; and when the energy of the evolving segmenting surface of the subsequent iteration does not change more than the threshold amount over the energy of the evolving segmenting surface of the previous iteration, then outputting the evolving segmenting surface of the subsequent iteration as the sparse representation of the shape of the anatomical object and as the segmentation of the anatomical object.

3. A system for automated segmentation of an anatomical object through learned examples, comprising:

an imaging device configured to acquire an image of the anatomical object;

a data storage device in communication with the imaging device, the data storage device configured to store the image of the anatomical object;

a processing device in communication with the data storage device, the processing device configured for:

receiving the image of the anatomical object from the data storage device;

roughly aligning the shape of the anatomical object by determining a center of a Signed Distance Function (SDF) of the shape and applying an intrinsic alignment method to align the shape with a center of a selected reference shape;

vectorizing and storing SDFs ($\varphi_i$; i=1; ..., n) of all training shapes in columns of a matrix $D=[\varphi_1|\varphi_2|\ldots|\varphi_n|] \in \mathbb{R}^{m\times n}$ defined as a dictionary, with each column defined as an atom, m defined as a number of voxels in each training shape image, and n defined as a size (number) of training shapes, such that a shape SDF $\phi \in \mathbb{R}^m$ may be approximated as $$\phi \approx \tilde{\phi}(x) = Dx, \quad (6)$$

where $x \in \mathbb{R}^n$ is a weight vector which determines the contribution of each training shape in modeling the shape $\phi$; and determining a sparse representation of the roughly aligned shape of the anatomical object by iteratively evolving a segmenting surface as a combination of a level set segmentation and a linear combination of training shapes; and an output device configured for outputting the sparse representation of the shape of the anatomical object as the segmentation of the anatomical object.

4. The system of claim 3, wherein the processing device, in determining a sparse representation of the shape of the anatomical object, is configured for:

defining an objective function which minimizes an error between the shape of the anatomical object and the shape of the evolving surface;

initializing x randomly and $\phi$ as the shape SDF at substantially the center of the anatomical object in the image;

while an energy of the evolving segmenting surface of a subsequent iteration changes more than a threshold amount over an energy of the evolving segmenting surface of a previous iteration, then:

determining a sparse approximation of the evolving surface;

updating the evolving surface as the combination of the level set segmentation and the linear combination of training shapes, the combination weighted by a sparsity of the linear combination of training shapes; and refining the updated evolving surface by iteratively updating the objective function along one coordinate while keeping all other coordinates fixed; and when the energy of the evolving segmenting surface of the subsequent iteration does not change more than the threshold amount over the energy of the evolving segmenting surface of the previous iteration, then outputting to the output device the evolving segmenting surface of the subsequent iteration as the sparse representation of the shape of the anatomical object and as the segmentation of the anatomical object.

* * * * *